United States Patent
Preyssler et al.

(10) Patent No.: US 9,946,561 B2
(45) Date of Patent: Apr. 17, 2018

(54) LEAST PRIVILEGED OPERATING SYSTEM

(71) Applicant: Wind River Systems, Inc., Alameda, CA (US)

(72) Inventors: Thierry Preyssler, Alameda, CA (US); Mati Sauks, Alameda, CA (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 291 days.

(21) Appl. No.: 14/546,763

(22) Filed: Nov. 18, 2014

(65) Prior Publication Data

US 2016/0139810 A1    May 19, 2016

(51) Int. Cl.
*G06F 9/455* (2018.01)
*G06F 3/06* (2006.01)
*G06F 12/10* (2016.01)

(52) U.S. Cl.
CPC ............ *G06F 9/455* (2013.01); *G06F 3/0604* (2013.01); *G06F 3/0631* (2013.01); *G06F 3/0664* (2013.01); *G06F 3/0673* (2013.01); *G06F 12/10* (2013.01)

(58) Field of Classification Search
None
See application file for complete search history.

(56) References Cited

U.S. PATENT DOCUMENTS

| | | | |
|---|---|---|---|
| 9,438,424 B2 * | 9/2016 | Goss | H04L 9/3236 |
| 2007/0245041 A1 * | 10/2007 | Hua | G06F 13/28 |
| | | | 710/22 |
| 2016/0328272 A1 * | 11/2016 | Ahmed | G06F 9/4443 |

* cited by examiner

*Primary Examiner* — Midys Rojas
(74) *Attorney, Agent, or Firm* — Fay Kaplun & Marcin, LLP

(57) ABSTRACT

A method including mapping a first portion of a virtual memory containing code of an operating system for access by a processor; receiving a call for an entry point of the operating system; and mapping, after receiving the call, a second portion of the virtual memory containing data for executing entry point code associated with the entry point for access by the processor. The processor executing the operating system code is permitted to access only data from the first and second portions of the virtual memory.

20 Claims, 3 Drawing Sheets

LEAST PRIVILEGED OPERATING SYSTEM

BACKGROUND

Typical computer operating systems have access to all information and resources that they manage at all times. This remains the case even though only a subset of the information and resources are needed by the operating system at any given time. As a result, if any operating system entry point is compromised, the entire operating system may be rendered unstable or crash.

SUMMARY OF THE INVENTION

A method includes mapping a first portion of a virtual memory containing code of an operating system for access by a processor; receiving a call for an entry point of the operating system; and mapping, after receiving the call, a second portion of the virtual memory containing data for executing entry point code associated with the entry point for access by the processor. The processor executing the operating system code is permitted to access only data from the first and second portions of the virtual memory.

A system includes a memory, a processor, and a memory management unit. The memory management unit performs the operations of mapping a first portion of a virtual memory containing code of an operating system for access by a processor; receiving a call for an entry point of the operating system; and mapping, after receiving the call, a second portion of the virtual memory containing data for executing entry point code associated with the entry point for access by the processor. The processor executing the operating system code is permitted to access only data from the first and second portions of the virtual memory.

A non-transitory computer-readable storage medium stores a set of instructions that are executable by a processor. The set of instructions, when executed by the processor, cause the processor to perform operations including mapping a first portion of a virtual memory containing code of an operating system for access by a processor; receiving a call for an entry point of the operating system; and mapping, after receiving the call, a second portion of the virtual memory containing data for executing entry point code associated with the entry point for access by the processor. The processor executing the operating system code is permitted to access only data from the first and second portions of the virtual memory. The operations also include unmapping the second portion of the virtual memory when the execution of the entry point code is completed.

DETAILED DESCRIPTION

Figure 1:
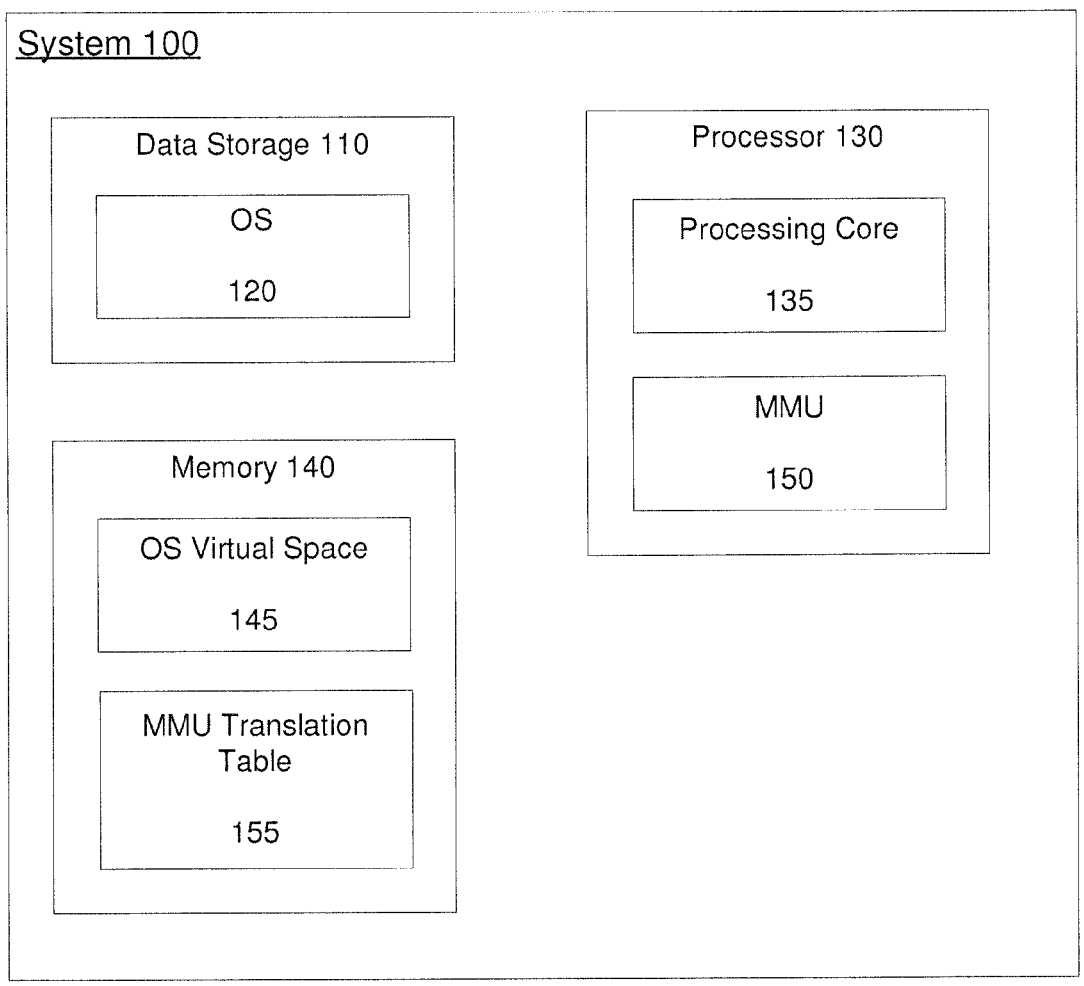
FIG. 1 schematically illustrates a computing system using an exemplary operating system that is configured according to the least privileged principle.

The exemplary embodiments may be further understood with reference to the following description and the related appended drawings, wherein like elements are provided with the same reference numerals. Specifically, the exemplary embodiments relate to methods and systems for improving the security of a computing system through the use of a least privileged operating system.

Typically, computer operating systems have access to all information and resources of a computing system. This full access for the operating system ("OS") remains the case even though a subset of the information and resources may be required at any given time (e.g., for a given OS entry point). If a given entry point or application programming interface ("API") operates inappropriately, whether due to an error or to an intrusion such as a virus or other malicious attack, other, unrelated data may also be corrupted. This may bring the OS into an unstable state, and may ultimately result in the OS crashing.

The exemplary embodiments may prevent such instability through the use of a least privileged principle. The least privileged principle requires that any given module (e.g., a process, program, user, etc.) be able to access only information and resources that are required for its legitimate purpose. As will be described in greater detail below, implementation of this principle will provide better stability and security for computing systems that are configured accordingly.

FIG. 1 schematically illustrates an exemplary system 100. The system 100 includes data storage 110 (e.g., a hard drive, flash drive, or other storage mechanism) storing software, program data, and other data that may typically be stored in a permanent storage of a computing device. The data storage 110 may store, among other data, an exemplary operating system 120 that may operate in accordance with the least privileged principle, as will be described in further detail hereinafter. The system 100 also includes processor 130, which may be any type of microprocessor known in the art and capable of executing the operating system 120 and other software. The processor 130 includes a processing core 135, though it will be known to those of skill in the art that processors including more than one processing core are also possible. The system 100 also includes a memory 140 (e.g., random-access memory) used in the active execution of software in the typical manner that is known to those of skill in the art. One portion of the memory 140 may comprise OS virtual space 145 for the OS 120. The OS virtual space 145 may include active memory for executing the code of the OS 120 as well as for code that is invoked by various OS entry points.

The system 100 also includes a memory management unit ("MMU") 150. Commonly, and in the exemplary system 100, the MMU 150 may be integrated with the processor 130, but those of skill in the art will understand that in alternative embodiments the MMU 150 may be a separate component. In the exemplary embodiments, the MMU 150 is used to map and unmap areas of the memory 140 for the operating system 120. Those skilled in the art will understand that MMU 150 is typically implemented as a hardware component executing firmware or other types of instructions. The hardware component may be a portion of the processor 130 or may also be implemented as a separate integrated circuit in communication with the processor 130. The MMU 150 may, among other tasks, control the OS virtual space 145 at a page level. The MMU 150 may also configure and refer to an MMU translation table 155, stored in the memory 140, that may enable the MMU 150 to translate requests for memory access, which typically reference a virtual memory address, to physical memory addresses of the requested memory. In some embodiments, the system 100 may also include a translation lookaside buffer ("TLB") cache, which may be memory local to the MMU 150 storing a portion of the contents of the MMU translation table 150 in order to speed up access to translation table information.

Examples of the system 100 may include personal computers (PCs), tablet computers, phablets, smart phones, embedded devices, etc. It should also be noted that while the system 100 shows the components 110, 130 and 140 as three separate components, one or more of the components may be implemented on a single hardware device, e.g., integrated circuit, printed circuit board, etc., and one or more of the components may also be implemented in software or virtually.

Figure 2:
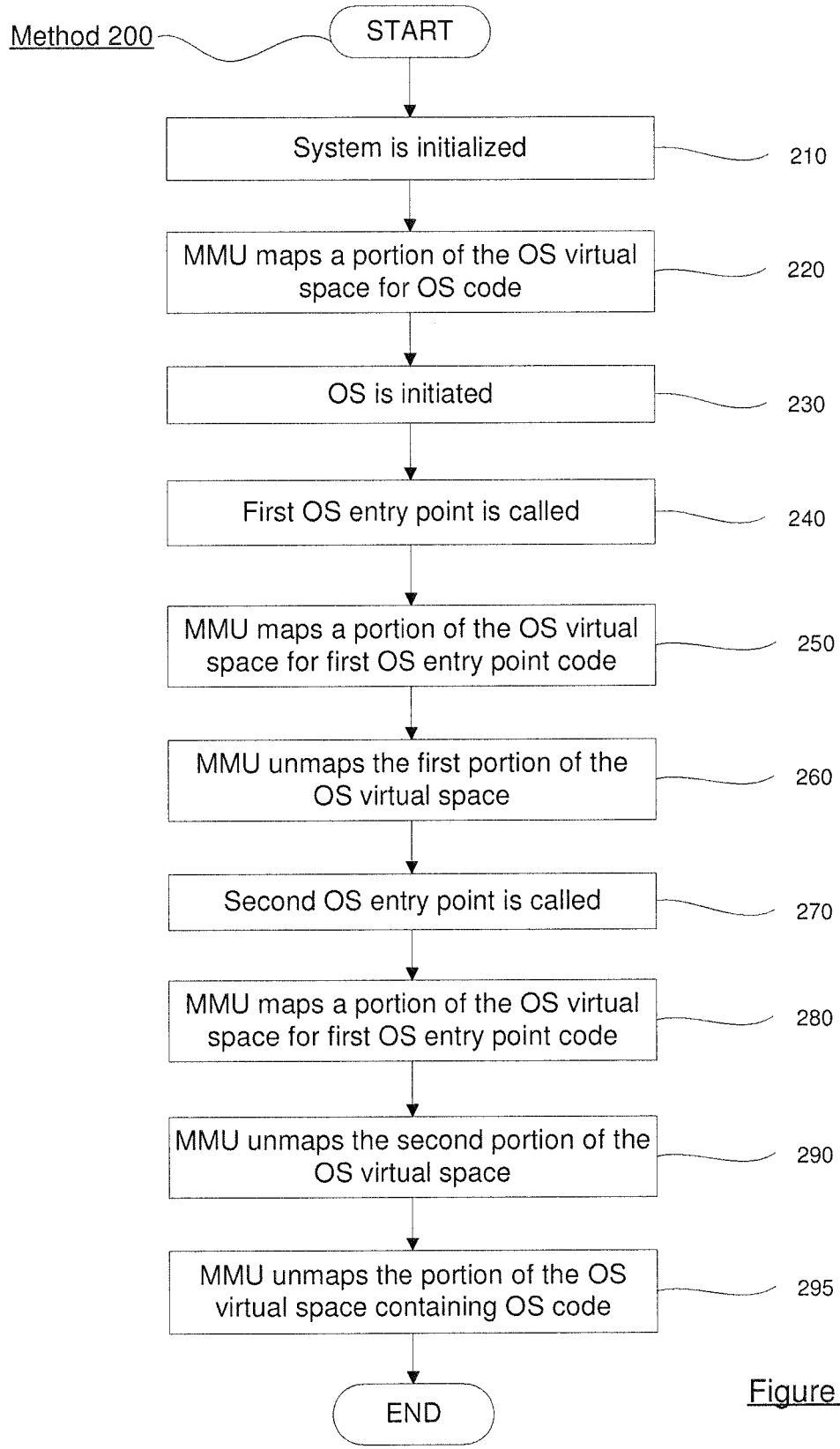
FIG. 2 shows an exemplary method for mapping and unmapping areas of operating system virtual memory of the system of FIG. 1 in order to implement a least privileged operating system.
Figure 3:
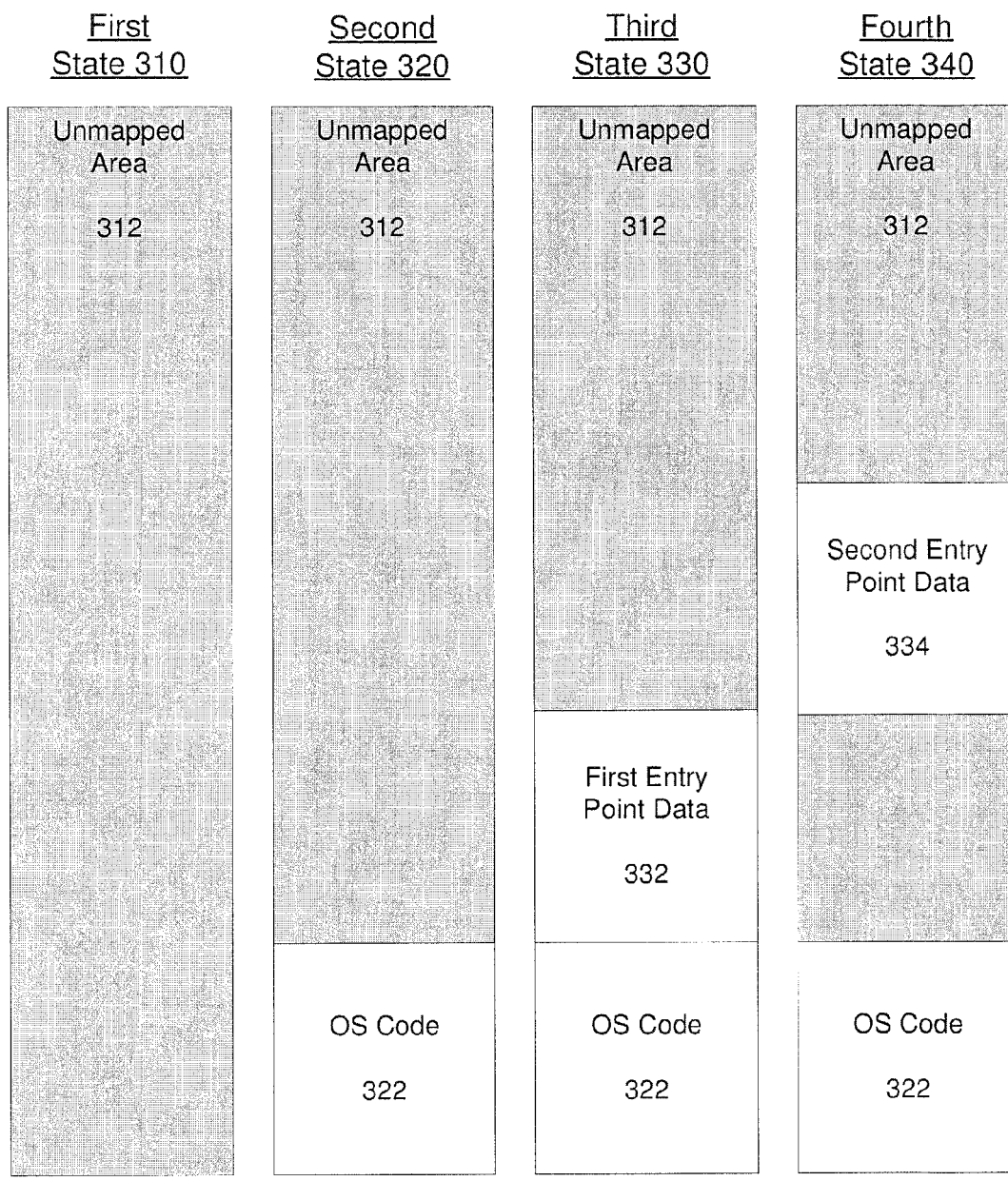
FIG. 3 shows maps of a memory area of a system such as the exemplary system of FIG. 1 at various stages during the performance of the exemplary method of FIG. 2.

FIG. 2 illustrates an exemplary method 200 for memory mapping and unmapping to execute the OS 120 in accordance with the least privileged principle, to improve the stability and security of the system 100. FIG. 3 shows contents of the memory 130 of the system 100 at various stages during the performance of the method 200. FIGS. 2 and 3 will be described hereinafter in conjunction with one another.

FIG. 3 shows the OS virtual space 145 at a first state 310, a second state 320, a third state 330 and a fourth state 340 of the system 100. In the various states shown in FIG. 3, areas of the OS virtual space 145 that are mapped and accessible by the OS 120 are designated using a white background and areas of the OS virtual space 145 that are unmapped from the perspective of the OS 120 are designated using a gray background. It will be apparent to those of skill in the art that the precise locations of the various areas in the memory 130 shown in FIG. 3 are only exemplary and that these locations may vary in other embodiments.

Prior to the initialization of the system 100, the OS virtual space 145 is in a first state 310. In this state, the virtual space 145 consists solely of unmapped area 312. In step 210, the initialization process for the system 100 is initiated. This may occur due to any prompting known in the art, such as a user initiating the system 100 or the system 100 being initiated due to an automated process. In step 220, the MMU 150 maps portions of the OS virtual space 145 to be accessible by the processing core 135 in executing code of the OS 120. It will be apparent to those of skill in the art that, at this point and elsewhere in the method 200, mapping or unmapping areas of the OS virtual space 145 for access by the processing core 135 may involve altering entries in the MMU translation table 155 entries and/or any TLB that may be present in the system 100. In other words, code of the OS 120 to be executed by the processing core 135 is already present in memory 140, but is simply not "visible" to the processing core 135 prior to this step.

In step 230, the OS 120 is initiated. At this point, the state of the OS virtual space 145 is shown in the second state 320 of FIG. 3. In the second state 320, an area containing OS code 322 has been mapped by the MMU 150 to be accessible by the processing core 135, and OS code 322 has been stored. The remainder of OS virtual space 145 remains unmapped area 312. In step 240, a first OS entry point is called. An entry point may be, for example, an API or a system call, and may relate to any hardware or software of the system 100. The calling of the first entry point in step 240 may trigger step 250, in which the MMU 150 maps, for the OS 120, a portion of OS virtual space 145 containing first entry point data 332. This may result in the third state 330 of OS virtual space 145, as shown in FIG. 3. In the third state 330, the portion of the OS virtual space 145 containing OS code 322 continues to be mapped, and, additionally, the portion of the OS virtual space 145 containing first entry point data 322 has been mapped as noted above. The remainder of OS virtual space 145 remains unmapped area 312.

Once steps 240 and 250 have been completed, the OS entry point that was called in step 240 may be performed. It will be apparent to those of skill in the art that the specific operations involved in such performance may vary depending on the specific nature of the first OS entry point. This may include, for example, executing a portion of the code of the OS 120, performing a call to a resource, accessing device driver code, etc. Because only the portions of the OS virtual space 145 containing the OS code 322 and the first entry point data 332 are mapped, those are the only portions of the OS virtual space 145 that are accessible to the first OS entry point or to the OS 120 itself. As a result, if the OS 120, as executed by the processing core 135, attempts to access data unrelated to the first OS entry point, the MMU 150 will generate an exception and stop the access to the requested data before corruption can occur. It will be apparent to those of skill in the art that this may be in accordance with standard functionality of a MMU such as the MMU 150, and that the MMU 150 therefore need not be specially configured to prevent such access. In this manner, the OS 120 may operate in accordance with the least privileged principle: the only data accessible to the OS 150 is data that is legitimately required by the OS 150 for the performance of its current tasks.

Once the performance of the first OS entry point has been completed, in accordance with the nature of the first OS entry point, in step 260 the MMU unmaps, for access by the processing core 135, the portion of OS virtual space 145 containing the first entry point data 332. This may result the OS virtual space 145 returning to the second state 320, as shown in FIG. 3. As was the case above, in the second state 320, the area containing OS code 322 remains been mapped by the MMU 150 for access by the processing core 135, and OS code 322 remains resident therein. The remainder of OS virtual space 145 is unmapped area 312, including the area that contained first entry point data 332.

In step 270, a second OS entry point is called. The second entry point, like the first entry point discussed above, may be, for example, an API and may relate to any hardware or software of the system 100. The calling of the second entry point in step 270 may trigger step 280, in which the MMU 150 maps, for access by the processing core 135, a portion of OS virtual space 145 containing second entry point data 342. This may result in the fourth state 340 of OS virtual space 145, as shown in FIG. 3. In the fourth state 340, the portion of the OS virtual space 145 containing OS code 322 continues to be mapped, and, additionally, the portion of the OS virtual space 145 containing second entry point data 342 has been mapped as noted above. The remainder of OS virtual space 145 remains unmapped area 312, including the area that contained first entry point data 332. As discussed above with reference to the first entry point, once steps 270 and 280 have been performed, the second OS entry point may be performed.

Once the performance of the second OS entry point has been completed, in accordance with the nature of the second OS entry point, in step 290 the MMU unmaps, for access by the processing core 135, the portion of OS virtual space 145 containing the second entry point data 342. This may result the OS virtual space 145 returning to the second state 320, as shown in FIG. 3. As was the case above, in the second state 320, the area containing OS code 322 remains been mapped by the MMU 150 for access by the processing core 135 during execution of the OS 120, and OS code 322 remains resident therein. The remainder of OS virtual space 145 is unmapped area 312, including the area that contained second entry point data 342.

Once termination of the OS 120 is triggered (which may be due to any cause, such as a manual or automatic shutdown), in step 295, the MMU unmaps the memory area containing OS code 322 from the OS virtual space 145. As noted above with reference to step 220, the unmapping of this area of the OS virtual space 145 may involve reverting MMU translation table entries and/or translation lookaside buffers to their original values, as is known in the art. Once this step has been performed, the OS virtual space 145 has been returned to the first state 310, in which the entire OS virtual space 145 encompasses unmapped area 312. Following step 295, performance of the method 200 is complete. In other embodiments, no shutdown step may be performed, and the system 100 may remain active at all times.

It will be apparent to those of skill in the art that a typical real-world implementation of an operating system may include far more than the two entry points discussed above, and that there may be a similar state to the states 330 and 340 described above corresponding to each additional OS entry point. It will be further apparent to those of skill in the art that the entry points need not be accessed in a particular sequence, and that the order of operations (e.g., initialize system, load OS, first OS entry point, second OS entry point, terminate OS) described above with reference to FIGS. 2 and 3 is only one exemplary set of operations. It will be further apparent to those of skill in the art that transitioning from the third state 330 to the fourth state 340 may occur due to any number of prompts, such as execution of new code, user inputs, context switches, etc.

The exemplary embodiments described above with reference to FIGS. 1-3 may enable an MMU to map areas of OS virtual memory for the OS on an as-needed basis and unmap the areas after they are no longer needed. The result of such an implementation may be an operating system that operates in accordance with the least privileged principle, i.e., an OS that only has access to a minimal set of resources that are legitimately required for the operations it is carrying out at any given time. A computing system incorporating an OS that operates according to this principle may have greater security and stability than a computing system incorporating a typical operating system that has access to all resources at all times.

Those of skill in the art will understand that the above-described exemplary embodiments may be implemented in any number of matters, including as a software module, as a combination of hardware and software, etc. For example, the exemplary method 200 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
   mapping a first portion of a virtual memory for access by a processor, wherein the first portion of the virtual memory contains code of an operating system;
   executing, by the processor, the operating system based on the mapping of the first portion of the virtual memory;
   receiving a call for a first entry point of the operating system, wherein a second portion of the virtual memory contains data corresponding to the first entry point and wherein the second portion of the virtual memory is not mapped for access by the processor; and
   mapping, based on receiving the call for the first entry point, the second portion of the virtual memory for access by the processor, wherein the processor is permitted to access the first portion of the virtual memory and the second portion of the virtual memory based on the mapping for access by the processor and wherein the processor is not permitted to access a third portion of the virtual memory, wherein the third portion of the virtual memory is not mapped for access by the processor and contains data corresponding to a second entry point.

2. The method of claim 1, further comprising:
   unmapping the second portion of the virtual memory from the processor when the execution of the first entry point is completed, wherein, after the unmapping, the processor executing the operating system is permitted to access the first portion of the virtual memory based on the mapping of the first portion of the virtual memory for access by the processor and the processor is not permitted to access the second portion of the virtual memory and the third portion of the virtual memory based on the second portion of the virtual memory and the third portion of the virtual memory not being mapped for access by the processor.

3. The method of claim 2, further comprising:
   receiving an indication that the execution of the first entry point has been completed, wherein the unmapping the second portion of the virtual memory is performed after receiving the indication.

4. The method of claim 2, further comprising:
   receiving a further call for the second entry point of the operating system; and
   mapping, based on receiving the further call, the third portion of the virtual memory, wherein the processor is permitted to access the first portion of the virtual memory and the third portion of the virtual memory based on the mapping for access by the processor and the processor is not permitted to access the second portion of the virtual memory based on the second portion of the virtual memory not being mapped for access by the processor.

5. The method of claim 4, further comprising:
   unmapping the third portion of the virtual memory when the execution of the further entry point is completed, wherein, after the unmapping, the processor is permitted to access the first portion of the virtual memory based on the first portion of the virtual memory being mapped for access by the processor and the processor is not permitted to access the second portion of the virtual memory and the third portion of the virtual memory based on the second portion of the virtual memory and the third portion of the virtual memory not being mapped for access by the processor.

6. The method of claim 5, further comprising:
   receiving an indication that the execution of the further entry point has been completed, wherein the unmapping of the third portion of the virtual memory is performed after receiving the indication.

7. The method of claim 1, further comprising:
generating an exception, if after the mapping of the second portion of the virtual memory for access by the processor, the processor attempts to access data that is not from the first portion of the virtual memory and second portion of the virtual memory.

8. The method of claim 1, wherein the first entry point relates to one of an application programming interface, a hardware access, and a software application.

9. The method of claim 1, wherein the mapping the first portion of the virtual memory, the receiving the call and mapping the second portion of the virtual memory are performed by a memory management unit.

10. The method of claim 1, wherein the virtual memory comprises a portion of a random access memory.

11. A system, comprising:
a memory;
a processor; and
a memory management unit performing the operations of:
mapping a first portion of a virtual for access by a processor, wherein the first portion of the virtual memory contains code of an operating system and wherein the processor executed the operating system based on the mapping of the first portion of the virtual memory;
receiving a call for a first entry point of the operating system, wherein a second portion of the virtual memory contains data corresponding to the first entry point and wherein the second portion of the virtual memory is not mapped for access by the processor; and
mapping, based on receiving the call for the first entry point, the second portion of the virtual memory for access by the processor, wherein the processor is permitted to access the first portion of the virtual memory and the second portion of the virtual memory based on the mapping for access by the processor and wherein the processor is not permitted to access a third portion of the virtual memory, wherein the third portion of the virtual memory is not mapped for access by the processor and contains data corresponding to a second entry point.

12. The system of claim 11, wherein the operations further comprise:
unmapping the second portion of the virtual memory from the processor when the execution of the first entry point is completed, wherein, after the unmapping, the processor executing is permitted to access first portion of the virtual memory based on the mapping of the first portion of the virtual memory for access by the processor and the processor is not permitted to access the second portion of the virtual memory and the third portion of the virtual memory based on the second portion of the virtual memory and the third portion of the virtual memory not being mapped for access by the processor.

13. The system of claim 12, wherein the operations further comprise:
receiving an indication that the execution of the first entry point has been completed, wherein the unmapping the second portion of the virtual memory is performed after receiving the indication.

14. The system of claim 12, wherein the operations further comprise:
receiving a further call for the second entry point of the operating system; and
mapping, based on receiving the further call, the third portion of the virtual memory, wherein the processor is permitted to access the first portion of the virtual memory and third portion of the virtual memory based on the mapping for access by the processor and the processor is not permitted to access the second portion of the virtual memory based on the second portion of the virtual memory not being mapped for access by the processor.

15. The system of claim 14, wherein the operations further comprise:
unmapping the third portion of the virtual memory when the execution of the second entry point is completed, wherein, after the unmapping, the processor is permitted to access the first portion of the virtual memory based on the mapping for access by the processor and the processor is not permitted to access the second portion of the virtual memory and the third portion of the virtual memory based on the second portion of the virtual memory and the third portion of the virtual memory not being mapped for access by the processor.

16. The system of claim 15, wherein the operations further comprise:
receiving an indication that the execution of the second entry point has been completed, wherein the unmapping the third portion of the virtual memory is performed after receiving the indication.

17. The system of claim 11, wherein the operations further comprise:
generating an exception, if after the mapping of the second portion of the virtual memory for access by the processor, the processor attempts to access data that is not from the first portion of the virtual memory and the second portion of the virtual memory.

18. The system of claim 11, wherein the first entry point relates to one of an application programming interface, a hardware access, and a software application.

19. The system of claim 11, wherein the virtual memory comprises a portion of the memory.

20. A non-transitory computer-readable storage medium storing a set of instructions that are executable by a processor, the set of instructions, when executed by the processor, causing the processor to perform operations comprising:
mapping a first portion of a virtual memory for access by the processor, wherein the first portion of the virtual memory contains code of an operating system;
executing the operating system based on the mapping of the first portion of the virtual memory;
receiving a call for a first entry point of the operating system, wherein a second portion of the virtual memory contains data corresponding to the first entry point and wherein the second portion of the virtual memory is not mapped for access by the processor;
mapping, based on receiving the call for the first entry point, the second portion of the virtual memory for access by the processor, wherein the processor is permitted to access the first portion of the virtual memory and second portion of the virtual memory based on the mapping for access by the processor and wherein the processor is not permitted to access a third portion of the virtual memory, wherein the third portion of the virtual memory is not mapped for access by the processor and contains data corresponding to a second entry point; and unmapping the second portion of the virtual memory when the execution of the first entry point code is completed.

\* \* \* \* \*

UNITED STATES PATENT AND TRADEMARK OFFICE
CERTIFICATE OF CORRECTION

PATENT NO. : 9,946,561 B2  
APPLICATION NO. : 14/546763  
DATED : April 17, 2018  
INVENTOR(S) : Preyssler et al.

Page 1 of 1

It is certified that error appears in the above-identified patent and that said Letters Patent is hereby corrected as shown below:

In the Claims

Claim 11, Column 7, Line 21:
"mapping a first portion of a virtual for access by a" should read "mapping a first portion of a virtual memory for access by a"

Claim 12, Column 7, Line 49:
"access first portion of" should read "access the first portion of"

Signed and Sealed this
Second Day of July, 2019

Andrei Iancu
*Director of the United States Patent and Trademark Office*